US012529011B2

(12) United States Patent
Waters et al.

(10) Patent No.: US 12,529,011 B2
(45) Date of Patent: Jan. 20, 2026

(54) NATURALLY DERIVED SURFACTANT SYSTEM AND COMPOSITION COMPRISING THE SAME

(71) Applicant: Conopco, Inc., Englewood Cliffs, NJ (US)

(72) Inventors: David Waters, Seymour, CT (US); Mingjun Yuan, Woodbridge, CT (US)

(73) Assignee: Conopco, Inc., Hoboken, NJ (US)

( * ) Notice: Subject to any disclaimer, the term of this patent is extended or adjusted under 35 U.S.C. 154(b) by 491 days.

(21) Appl. No.: 18/007,580

(22) PCT Filed: Jun. 2, 2021

(86) PCT No.: PCT/EP2021/064838

§ 371 (c)(1),
(2) Date: Dec. 1, 2022

(87) PCT Pub. No.: WO2021/245159

PCT Pub. Date: Dec. 9, 2021

(65) Prior Publication Data

US 2023/0332072 A1 Oct. 19, 2023

(30) Foreign Application Priority Data

Jun. 4, 2020 (EP) .................................... 20178377

(51) Int. Cl.

*C11D 1/00* (2006.01)
*C11D 1/04* (2006.01)
*C11D 1/83* (2006.01)

(52) U.S. Cl.

CPC . *C11D 1/83* (2013.01); *C11D 1/04* (2013.01)

(58) Field of Classification Search

None
See application file for complete search history.

(56) References Cited

U.S. PATENT DOCUMENTS

2011/0152148 A1 6/2011 Kunieda et al.
2015/0141466 A1 5/2015 Klug et al.
2016/0074310 A1 3/2016 Klug et al.
2017/0071846 A1 3/2017 Schelges et al.
2019/0105244 A1 * 4/2019 Song ...................... A61K 8/737
2019/0125650 A1 5/2019 Lee et al.
2019/0224099 A1 7/2019 Gauczinski et al.
2020/0046623 A1 2/2020 Segawa

FOREIGN PATENT DOCUMENTS

CN 107638362 9/2017
CN 109106608 1/2019
CN 105213261 10/2020
JP 408231381 9/1996
WO WO2017216162 12/2017
WO WO2018221420 12/2018
WO WO2019036591 2/2019

OTHER PUBLICATIONS

Search Report and Written Opinion in EP20178376.8; Nov. 5, 2020.
Kenneth Mason; The use of NatraGem Natureal Fragrance Solubiliser (NNFS) in Personal Care Formulations; ISSN: 0374-4353; Feb. 1, 2014; Research Disclosure Publ. Hampshire, UK.
Nnanna Ifendu A et al; Protein-based surfactants; Potential applications of protein-based surfactants; Jan. 1, 2001; p. 227/232 paragraph 1.
Anonymous; Purify Botanic Wash for Sensitive & Normal skin; XP55741498; Apr. 23, 2019; 1,4; Database GNPD Mintel.
Qinghai Younike Biotechnology Co Ltd; XP2800797; Thomas Scientific London GB; Jan. 6, 2016; abstract; week 201635.
Search Report and Written Opinion in EP20178377; Nov. 23, 2020.
Search Report & Written Opinion in PCT/EP2021/064838;Aug. 9, 2021.
Fissan Piccolo Mio Bagnetto Delicato (My Baby Delicate Bath), Italy, Unilever, Mintel; Nov. 2018.
Zwitsal Naturals Bath and Wash Cream, Belgium, Unilever, Mintel; Aug. 2018.

* cited by examiner

*Primary Examiner* — Necholus Ogden, Jr.
(74) *Attorney, Agent, or Firm* — Edward A. Squillante, Jr.

(57) ABSTRACT

The present invention is directed to a naturally derived surfactant system and an end use composition comprising the surfactant system. The naturally derived surfactant system comprises an anionic and nonionic surfactant that is stable in an end use composition having a pH from 4.8 to 6.5. Such end use compositions are mild, have excellent lathering characteristics, and do not require glycinates, polyglycosides, betaines, sultaines and sulfates.

18 Claims, No Drawings

NATURALLY DERIVED SURFACTANT SYSTEM AND COMPOSITION COMPRISING THE SAME

FIELD OF THE INVENTION

The present invention is directed to a naturally derived surfactant system and an end use composition comprising the same. More particularly, the naturally derived surfactant system comprises an anionic and nonionic surfactant that surprisingly are stable in an end use composition having a pH from 4.8 to 6.5. Such compositions are mild, have excellent lathering characteristics, and do not require glycinates, polyglycosides, betaines, sultaines and sulfates.

BACKGROUND OF THE INVENTION

Surfactants are used in many consumer products, including cosmetics, shampoos and home care compositions. Traditionally, many are synthesized from petroleum derivatives.

Save for water, surfactants are one of the most abundant ingredients in personal care compositions, especially wash compositions. The use of surfactants in personal care compositions often results in benefit delivery to most consumers. Unfortunately, however, since compositions with surfactants are at some point washed off the body, surfactants regularly find their way into the environment as they are carried in waste water. As waste water often terminates on land and in waterways, surfactants are deposited or delivered to soil and bodies of water, leading to conditions that can be detrimental to plants, ecosystems, animals and even humans. Another issue concerning compositions with surfactants is they may be harsh on skin in view of the fact that they can be difficult to formulate at a pH that is close to the natural pH of skin.

It is of increasing interest to develop compositions with surfactants that are less harsh not only to the environment but also to the consumer. Particularly, there is a need to develop compositions having surfactants that are biodegradable, less toxic and suitable to be formulated in a composition having a pH that is close to the natural pH of skin. The present invention, therefore, is directed to a naturally derived surfactant system and an end use composition comprising the same. The naturally derived surfactant system comprises an anionic and a nonionic surfactant wherein such system surprisingly remains stable in an end use composition having a pH from 4.8 to 6.5 and results in excellent lathering characteristics. Such compositions are mild, substantially free of polyglycosides, betaines, sultaines and sulfates, and are gentle enough for use on the most fragile consumers, babies.

Additional Information

Efforts have been disclosed for making cleaning compositions. In U.S. Patent Application Publication No. 2016074310A, compositions with N-methyl-N-acylglucamine and N-acyl-amino acid surfactant are described.

Other efforts have been disclosed for making cleaning compositions. In U.S. Patent Application No. 2019125650, hair care compositions with carboxylate anionic surfactants are described.

Even other efforts have been disclosed for making cleaning compositions. In U.S. Pat. No. 5,951,991, dry, disposable, personal cleansing products having an insoluble substrate and lathering surfactant are described.

None of the additional information describes a naturally derived surfactant system and end use composition comprising the same as described and claimed herein.

SUMMARY OF THE INVENTION

In a first aspect, the present invention is directed to a surfactant system comprising:

a) an anionic dicarboxylate surfactant comprising a glutamate, aspartate or both;

b) a nonionic surfactant comprising a glucamide; and c) optionally, water wherein the surfactant system is suitable for use in an end use composition that has a pH from 4.8 to 6.5, the anionic dicarboxylate and nonionic comprising a glucamide are at a weight ratio from 10:1 to 1:10 and make up from 80 to 100% by weight total surfactant in the surfactant system.

In a second aspect, the present invention is directed to a surfactant system comprising:

a) an anionic dicarboxylate comprising a glutamate, aspartate or both, the glutamate and/or aspartate having a formula:

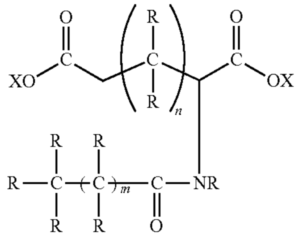

b) nonionic comprising a glucamide having a formula:

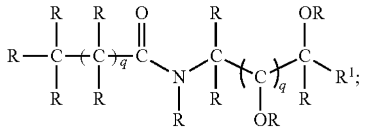

and c) optionally water wherein the surfactant system is suitable for use in an end use composition that has a pH from 4.8 to 6.5, the anionic dicarboxylate and nonionic are at a weight ratio from 10:1 to 1:10 and make up from 80 to 100% by weight total surfactant in the surfactant system and where from 10 to 90% by weight of the surfactant is neutralized, further wherein:

i) each R is independently H or a $C_{1-6}$ alkyl, with the proviso that at least 50% of the R groups on each formula independently are H;

ii) each X is independently $H^+$, $Na^+$, $K^+$, $Ca^+$ or $Mg^+$, with the proviso that each X is not simultaneously $H^+$;

iii) n is 0 or 1, and m is an integer from 6 to 18;

iv) each q is independently an integer from 2 to 18; and v) $R^1$ is H, OH, $C_{1-6}$ alkyl or

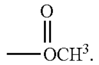

In a third aspect, the present invention is directed to an end use composition that comprises the surfactant system of the first and/or second aspect of the invention.

In a fourth aspect, the present invention is directed to a method for treating skin with the end use composition of the third aspect of this invention.

In a fifth aspect, the present invention is directed to the use of the composition of the third aspect of the invention at a pH from 4.8 to 6.5 to treat skin.

All other aspects of the present invention will more readily become apparent from the description and examples which follow.

Skin, as used herein, is meant to include skin on the arms (including underarms), face, feet, neck, chest, hands, legs, buttocks and scalp (including hair). The surfactant system of the present invention is typically 80 to 100% by weight anionic dicarboxylate and nonionic comprising glucamide (surfactants) as described herein. End use compositions comprising the surfactant system will also comprise as total surfactant from 80 to 100% by weight anionic dicarboxylate and nonionic comprising glucamide as herein described based on total weight of surfactant in the end use composition. Such end use compositions can be home care cleaning compositions but are preferably shampoos, make-up washes, facial washes or personal care liquid body washes. The composition having the surfactant system is ready for topical application and to be wiped or washed off, and preferably, washed off, with water. The composition may, optionally, comprise medicinal or therapeutic agents, but preferably, is a wash which is a cosmetic and non-therapeutic wash. In one embodiment of the invention, the composition can be a home care composition like a table top or toilet cleaning composition. In another embodiment, the composition is a shampoo composition. In still another embodiment, the end use composition is a personal wash composition. In yet another embodiment of the invention, the wash composition of the invention is a baby wash composition, preferably, a hair or body wash, and most preferably, a baby body wash. As hereinafter described, the composition of the present invention may optionally comprise skin benefit ingredients added thereto such as emollients, vitamins and/or derivatives thereof, resorcinols, retinoic acid precursors, colorants, moisturizers, sunscreens, mixtures thereof or the like. The skin benefit ingredients (or agents) may be water or oil soluble. If used, oil soluble skin benefit agents typically make up to 2.0% by weight of the end use composition whereby water soluble skin benefit agents, when used, typically make up to 10% by weight of the end use composition. The end use composition typically has a pH from 4.8 to 6.5. Viscosity, unless noted otherwise, is taken at 25° C. with a Discovery HR-2 Rheometer using sand blasted plates with a 100 micron gap and a shear rate of 4 $s^{-1}$. Stable, as used herein, means no discoloration or phase separation of the composition after being stored for at least one (1) month at 25° C., preferably from 2 to 4 months at 25° C. As used herein, substantially free of additional surfactant means less than 20% by weight, and preferably, less than 15% by weight, and most preferably, less than 5% by weight additional surfactant, based on total weight of surfactant in the surfactant system and end use composition, with the provisio that a glycinate makes up no more than 2.5% (preferably no more than 2.0%, and most preferably, no more than 1.5%) by weight and betaine makes up less than 0.5% by weight of the total weight of surfactant in the in the end use composition when the end use composition has a total surfactant level that does not exceed 5% by weight of the total weight of the end use composition. In an embodiment of the invention the surfactant system and end use composition have no additional surfactant (i.e., 0.0%) in addition to the anionic dicarboxylate comprising a glutamate, aspartate or both, and the nonionic comprising a glucamide. As used herein, "do not require" means less than 20% by weight, and preferably, less than 5% by weight, and most preferably, from 0 to 1% by weight of the total weight of surfactant in the surfactant system and end use composition with the provisos that a glycinate and betaine make up amounts as previously defined. In an embodiment of the invention, the surfactant system and composition are free of (i.e., 0.0%) glycinates, polyglycosides, betaines, sultaines and sulfates. In another embodiment of the invention, the surfactant system and end use composition comprise from 0.01 to 1.5% by weight glycinate, and most preferably, no glycinate (0.0% by weight) based on total weight of the surfactant in the surfactant system and end use composition. In another embodiment of the invention, betaine makes up from 0.0001 to 0.4% by weight of the surfactant system and end use composition, and most preferably, 0.0% by weight of the surfactant in the surfactant system and end use composition. The term comprising is meant to encompass the terms consisting essentially of and consisting of. For the avoidance of doubt, and for illustration, the composition of this invention comprising surfactant, water and vitamin is meant to include a composition consisting essentially of the same and a composition consisting of the same. Except in the operating comparative examples, or where otherwise explicitly indicated, all numbers in this description indicating amounts or ratios of materials or conditions and/or physical properties of materials and/or use are to be understood as modified by the word "about".

DETAILED DESCRIPTION OF THE INVENTION

The surfactant system of the present invention comprises an anionic dicarboxylate comprising a glutamate, aspartate or both and a nonionic comprising a glucamide; and water wherein the surfactant system is suitable for use in an end use composition that has a pH from 4.8 to 6.5, the anionic dicarboxylate and nonionic are at a weight ratio from 10:1 to 1:10 and make up from 80 to 100% by weight total surfactant in the surfactant system. It is also within the scope of the present invention for 80 to 100% by weight of the total surfactant used in end use composition to be anionic dicarboxylate and nonionic as herein described. In an embodiment of the invention, the anionic dicarboxylate comprising a glutamate, aspartate or both and a nonionic comprising a glucamide make up from 85 to 100%, and preferably, from 95 to 100% by weight of the total surfactant in the surfactant system (and end use composition), including all ranges subsumed therein. In another embodiment of the invention, the anionic consists essentially of or consists of glutamate and/or aspartate. In still another embodiment of the invention, the nonionic consists essentially of or consists of glucamide. In even another embodiment of the invention, the anionic is a glutamate and the nonionic is a glucamide. In a further embodiment of the invention, 100% by weight of all surfactant used in the surfactant system and end use composition is glutamate and/or aspartate and glucamide. In yet another embodiment of the invention, the surfactant used in the surfactant system and end use composition is 100% by weight glutamate and glucamide.

In a preferred embodiment of the invention, the anionic dicarboxylate and nonionic are at a weight ratio from 1:4 to 4:1, more preferably, from 1:3 to 3:1, and most preferably, from 1:2 to 2:1. In still another embodiment of the invention, the weight ratio of anionic dicarboxylate to nonionic is from 1:1.5 to 1.5:1, including all weight ratios assumed therein. The pH of the end use composition comprising the surfactant system of the invention is typically from 4.8 to 6.5, preferably, from 5.0 to 6.2, and even more preferably, from 5.1 to 6.2, and most preferably, from 5.2 to 5.8, including all ranges subsumed therein. The surfactant system of the present invention can be anhydrous (under 1% by weight water) but typically comprises from 10 to 92% by weight water, and preferably, 30 to 85% by weight water, and most preferably, from 50 to 80% by weight water, including all ranges subsumed therein.

The pH of the surfactant system that comprises of the present invention is the same as the ranges identified herein for such end use compositions, and therefore, broadly defined as 4.8 to 6.5, including all ranges subsumed therein. The weight ratio of surfactant in the end use composition that comprises the surfactant system of the present invention is also the same as the weight ratio ranges identified herein for such surfactant systems, and therefore, broadly defined as 1:10 to 10:1, including all ranges subsumed therein.

The end use composition will have from 1 to 40% by weight surfactant. In an embodiment of the invention, the end use composition will have from 1.5 to 30% by weight surfactant.

In yet another embodiment, the end use composition will have from 3 to 20% by weight surfactant and in still another embodiment, such composition will have from 4 to 15% by weight surfactant, including all ranges subsumed therein.

As to the surfactants used in this invention, from 10 to 90% by weight of the surfactants are neutralized, preferably, from 25 to 70%, and most preferably, from 45 to 55% by weight of surfactant is neutralized, including all ranges subsumed therein. Neutralization is achieved with bases that provide as counter ions sodium, potassium, calcium, magnesium, ammonium or substituted ammonium.

Illustrative examples of glutamates suitable for use in the present invention include sodium lauroyl glutamate, sodium cocoyl glutamate, potassium lauroyl glutamate, potassium cocoyl glutamate, mixtures thereof or the like. Illustrative examples of aspartates suitable for use either alone or together with glutamates include sodium lauroyl aspartate, potassium lauroyl aspartate, sodium cocoyl aspartate, potassium cocoyl aspartate, mixtures thereof or the like.

As to the nonionic glucamides suitable for use in the present invention, illustrative examples include lauroyl methyl glucamide, myristoyl methyl glucamide, cocoyl methyl glucamide, capryloyl/caproyl methyl glucamide, sunfloweroyl methyl glucamide mixtures thereof or the like.

The glutamates, aspartates and glucamides suitable for use in the present invention are available from suppliers like Stepan Company, Clariant AG, Croda, Galaxy Surfactants, Sino Lion, Innospec and Dow Chemical. As to the glucamides, often preferred are those sold commercially under the names Gluco Tain® Clean, Gluco Tain® Flex, Gluco Tain® Care, Gluco Tain® Clean, Gluco Tain® Plus, and Gluco Tain® Sense from Clariant AG.

As to optional surfactants (i.e., surfactants that make up less than 20% by weight of the surfactant system and end use composition as defined herein) that may be used with the surfactant system and composition of this invention, the same include anionic surfactants which can be aliphatic sulfonates, such as a primary alkane (e.g., $C_8$-$C_{22}$) sulfonate, primary alkane (e.g., $C_8$-$C_{22}$) disulfonate, $C_8$-$C_{22}$ alkene sulfonate, $C_8$-$C_{22}$ hydroxyalkane sulfonate or alkyl glyceryl ether sulfonate (AGS); or aromatic sulfonates such as alkyl benzene sulfonate. The anionic may also be an alkyl sulfate (e.g., $C_8$-$C_{18}$ alkyl sulfate) or alkyl ether sulfate (including alkyl glyceryl ether sulfates). Among the alkyl ether sulfates are those having the formula:

$$RO(CH_2CH_2O)_nSO_3M$$

wherein R is an alkyl or alkenyl having 8 to 18 carbons, preferably 12 to 18 carbons, n has an average value of at least 1.0, preferably less than 5, and most preferably 1 to 4, and M is a solubilizing cation such as sodium, potassium, ammonium or substituted ammonium.

The anionic may also include alkyl sulfosuccinates (including mono- and dialkyl, e.g., $C_6$-$C_{22}$ sulfosuccinates); alkyl and acyl taurates (often methyl taurates), alkyl and acyl sarcosinates, sulfoacetates, $C_8$-$C_{22}$ alkyl phosphates and phosphonates, alkyl phosphate esters and alkoxyl alkyl phosphate esters, acyl lactates, $C_8$-$C_{22}$ monoalkyl succinates and maleates, sulphoacetates, alkyl glucosides and acyl isethionates, and the like.

Sulfosuccinates may be monoalkyl sulfosuccinates having the formula:

$$R^1OC(O)CH_2CH(SO_3M)CO_2M;$$

and amide-MEA sulfosuccinates of the formula:

$$R^1CONHCH_2CH_2OC(O)CH_2CH(SO_3M)CO_2M$$

wherein $R^1$ ranges from $C_8$-$C_{22}$ alkyl.

Sarcosinates are generally indicated by the formula:

$$R^2CON(CH_3)CH_2CO_2M,$$

wherein $R^2$ ranges from $C_8$-$C_{20}$ alkyl.

Taurates are generally identified by formula:

$$R^3CONR^4CH_2CH_2SO_3M$$

wherein $R^3$ is a $C_8$-$C_{20}$ alkyl, $R^4$ is a $C_1$-$C_4$ alkyl.

M is a solubilizing cation as previously described.

Other optional surfactants that may be used include $C_8$-$C_{18}$ acyl isethionates. These esters are prepared by a reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in Ilardi et al., U.S. Pat. No. 5,393,466, entitled "Fatty Acid Esters of Polyalkoxylated isethonic acid; issued Feb. 28, 1995; hereby incorporated by reference. This compound has the general formula:

$$R^5C(O)O—C(X)H—CH_2—(OC(Y)H—CH_2)_m—SO_3M$$

wherein $R^5$ is an alkyl group having 8 to 18 carbons, m is an integer from 1 to 4, X and Y are each independently hydrogen or an alkyl group having 1 to 4 carbons and M is a solubilizing cation as previously described.

In an embodiment of the invention, the anionic surfactant can optionally include sodium lauroyl isethionate, sodium cocoyl isethionate, sodium methyl lauroyl taurate, sodium methyl cocoyl taurate or a mixture thereof. Such anionic surfactants are commercially available from suppliers like Galaxy Surfactants, Clariant, Sino Lion and Innospec.

Amphoteric surfactants suitable for optional use in the invention (which depending on pH can be zwitterionic) include sodium acyl amphoacetates, sodium acyl amphopropionates, disodium acyl amphodiacetates and disodium acyl amphodipropionates where the acyl (i.e., alkanoyl group) can comprise a $C_7$-$C_{18}$ alkyl portion. Illustrative examples of the amphoteric surfactants suitable for use include sodium lauroamphoacetate, sodium cocoamphoacetate, sodium lauroamphoacetate, sodium cocoamphoacetate and mixtures thereof.

As to the zwitterionic surfactants that may optionally be used in the present invention, such surfactants include at least one acid group. Such an acid group may be a carboxylic or a sulphonic acid group. They often include quaternary nitrogen, and therefore, can be quaternary amino acids. They should generally include an alkyl or alkenyl group of 7 to 18 carbon atoms generally comply with an overall structural formula:

$$R^6—[—C(O)—NH(CH_2)_q—]_r—N^+—(R^7—)(R^8)A\text{-}B$$

where $R^6$ is alkyl or alkenyl of 7 to 18 carbon atoms; $R^7$ and $R^8$ are each independently alkyl, hydroxyalkyl or carboxyalkyl of 1 to 3 carbon atoms; q is 2 to 4; r is 0 to 1; A is alkylene of 1 to 3 carbon atoms optionally substituted with hydroxyl, and B is $—CO_2—$ or $—SO_3—$.

Suitable zwitterionic surfactants for use in the present invention and within the above general formula include simple betaines of formula:

$$R^6—N^+(R^7)(R^8)—CH_2CO_2^-$$

and amido betaines of formula:

$$R^6—CONH(CH_2)_t—N^+(R^7)(R^8)—CH_2CO_2^-$$

where t is 2 or 3.

In both formulae $R^6$, $R^7$ and $R^8$ are as defined previously. $R^6$ may, in particular, be a mixture of 012 and 014 alkyl groups derived from coconut oil so that at least half, preferably at least three quarters of the groups $R^6$ have 10 to 14 carbon atoms. $R^7$ and $R^8$ are preferably methyl.

A further possibility is that the zwitterionic surfactant is a sulphobetaine of formula:

$$R^6—N^+(R^7)(R^8)—(CH_2)_3SO_3^-$$

or $$R^6—CONH(CH_2)_u—N^+(R^7)(R^8)—(CH_2)_3SO_3^-$$

where u is 2 or 3, or variants of these in which $—(CH_2)_3SO_3^-$ is replaced by $—CH_2C(OH)(H)CH_2SO_3^-$.

In these formulae, $R^6$, $R^7$ and $R^8$ are as previously defined.

Illustrative examples of the zwitterionic surfactants suitable for optional use include betaines like cocodimethyl carboxymethyl betaine, cocoamidopropyl betaine and laurylamidopropyl betaine. An additional zwitterionic surfactant suitable for use includes cocoamidopropyl sultaine. Such surfactants are made commercially available from suppliers like Stepan Company, and it is within the scope of the invention to optionally employ mixtures of the aforementioned surfactants.

Additional nonionic surfactants that may optionally be used include in particular the reaction products of compounds having a hydrophobic group and a reactive hydrogen atom, for example aliphatic alcohols, acids, amides or alkylphenols with alkylene oxides, especially ethylene oxide either alone or with propylene oxide. Specific nonionic surfactant compounds are alkyl ($C_6$-$C_{22}$) phenols ethylene oxide condensates, the condensation products of aliphatic ($C_8$-$C_{18}$) primary or secondary linear or branched alcohols with ethylene oxide, and products made by condensation of ethylene oxide with the reaction products of propylene oxide and ethylenediamine. Other nonionic surfactants include long chain tertiary amine oxides, long chain tertiary phosphine oxides, dialkyl sulphoxides, and the like.

In an embodiment of the invention optional nonionic surfactants include fatty acid/alcohol ethoxylates having the following structures a) $HOCH_2(CH_2)_s(CH_2CH_2O)_v H$ or b) $HOOC(CH_2)_c(CH_2CH_2O)_d H$; where s and v are each independently an integer up to 18; and c and d are each independently an integer from 1 or greater. In an embodiment of the invention, s and v are each independently 6 to 18; c and d are each independently 1 to 30. Other options for nonionic surfactants include those having the formula $HOOC(CH_2)_i—CH═CH—(CH_2)_k(CH_2CH_2O)_z H$, where i, k are each independently 5 to 15; and z is 5 to 50. In another embodiment of the invention, i and k are each independently 6 to 12; and z is 15 to 35.

The optional nonionic may also include a sugar amide, such as a polysaccharide amide. Specifically, the surfactant may be one of the lactobionamides described in U.S. Pat. No. 5,389,279 to Au et al., entitled "Compositions Comprising Nonionic Glycolipid Surfactants issued Feb. 14, 1995; which is hereby incorporated by reference or it may be one of the sugar amides described in U.S. Pat. No. 5,009,814 to Kelkenberg, titled "Use of N-Poly Hydroxyalkyl Fatty Acid Amides as Thickening Agents for Liquid Aqueous Surfactant Systems" issued Apr. 23, 1991; hereby incorporated into the subject application by reference.

In further regard to the optional nonionic surfactants that may be used in the surfactant system and the end use composition of the present invention, it is within the scope of the invention to include a polyglycerol ester like polyglyceryl-4 oleate, polyglycerol polyricinoleate, polyglycerol ester-6 distearate, polyglycerol ester-10 stearate, polyglycerol ester-10 oleate, polyglycerol ester-10 dipalmitate, mixtures thereof or the like. When used, polyglycerol esters will make up no more than 18% by weight, and preferably, from 0.001 to 15%, and most preferably, from 0.01 to 10% by weight of total the total surfactant in the surfactant system and end use composition, including all ranges subsumed therein.

In an embodiment of the invention, cationic surfactants may optionally be used.

One class of cationic surfactants includes heterocyclic ammonium salts such as cetyl or stearyl pyridinium chloride, alkyl amidoethyl pyrrylinodium methyl sulfate, and lapyrium chloride.

Tetra alkyl ammonium salts are another useful class of cationic surfactants suitable for use. Examples include cetyl or stearyl trimethyl ammonium chloride or bromide; hydrogenated palm or tallow trimethylammonium halides; behenyl trimethyl ammonium halides or methyl sulfates; decyl isononyl dimethyl ammonium halides; ditallow (or distearyl) dimethyl ammonium halides, and behenyl dimethyl ammonium chloride.

Still other types of cationic surfactants that may be used are the various ethoxylated quaternary amines and ester quats. Examples include PEG-5 stearyl ammonium lactate (e.g., Genamin KSL manufactured by Clariant), PEG-2 coco ammonium chloride, PEG-15 hydrogenated tallow ammonium chloride, PEG 15 stearyl ammonium chloride, dipalmitoyl ethyl methyl ammonium chloride, dipalmitoyl hydroxyethyl methyl sulfate, and stearyl amidopropyl dimethylamine lactate.

Even other useful cationic surfactants suitable for use include quaternized hydrolysates of silk, wheat, and keratin proteins, and it is within the scope of the invention to use mixtures of the aforementioned cationic surfactants.

If optionally used, cationic surfactants will make up no more than 1.0% by weight of the end use composition. When present, they typically make up from 0.01 to 0.7%, and more typically, from 0.1 to 0.5% by weight of the end us composition, including all ranges subsumed therein. Regarding all other optional surfactants, these preferably make up less than 12%, more preferably, less than 6%, and most preferably, less than 3% by weight of the total weight of all surfactant in the in the surfactant system and end use composition. In an embodiment of the invention, the surfactant system and end use composition comprising the same are free of optional surfactant. Therefore, and in still another embodiment, the surfactants in the surfactant system and end use composition are 98% or more, and preferably, 99% or more by weight anionic dicarboxylate which is a glutamate and/or aspartate and a nonionic which is a glucamide. In an embodiment of the invention, the end use composition of the present invention is from 30 to 95% by weight water, preferably, from 30 to 85%, and most preferably, from 50 to 80% by weight water, including all ranges subsumed therein.

Adjusters suitable to modify/buffer the pH may be used. Such pH adjusters include triethylamine, NaOH, KOH, $H_2SO_4$, HCl, $C_6H_8O_7$ (i.e., citric acid) or mixtures thereof. The pH adjusters are added at amounts such that the resulting pH of the surfactant system and composition are as defined and desired, from 4.8 to 6.5. The pH values may be assessed with commercial instrumentation such as a pH meter made commercially available from Thermo Scientific®.

Optional skin benefit agents suitable for use in this invention are limited only to the extent that they are capable of being topically applied, and suitable to dissolve in the surfactant system and composition at the defined pH.

Illustrative examples of the benefit agents suitable to include in the water portion of the surfactant system and composition are acids, like amino acids, such as arginine, valine or histidine. Additional water soluble benefit agents suitable for use include vitamin $B_2$, niacinamide (vitamin $B_3$), vitamin $B_6$, vitamin C, mixtures thereof or the like. Water soluble derivatives of such vitamins may also be employed. For instance, vitamin C derivatives such as ascorbyl tetraisopalmitate, magnesium ascorbyl phosphate and ascorbyl glycoside may be used alone or in combination with each other. Other water soluble benefit agents suitable for use include 4-ethyl resorcinol, extracts like sage, aloe vera, green tea, grapeseed, thyme, chamomile, yarrow, cucumber, liquorice, rosemary extract or mixtures thereof. Water soluble sunscreens like ensulizole may also be used. Total amount of optional water soluble benefit agents (including mixtures) when present in the invention may range from 0.0 to 10%, preferably from 0.001 to 8%, and most preferably, from 0.01 to 6% by weight, based on total weight of the end use composition and including all ranges subsumed therein.

It is also within the scope of the present invention to optionally include oil (i.e., non-water) soluble benefit agents. The only limitation with respect to such oil soluble benefit agents are that the same are suitable to provide a benefit to skin when topically applied.

Illustrative examples of the types of oil soluble benefit agents that may optionally be used in the end use composition of this invention include components like stearic acid, vitamins like Vitamin A, D, E and K (and their oil soluble derivatives), sunscreens like ethylhexylmethoxycinnamate, bis-ethyl hexyloxyphenol methoxyphenol triazine, 2-ethylhexyl-2-cyano-3,3-diphenyl-2-propanoic acid, drometrizole trisiloxane, 3,3,5-trimethyl cyclohexyl 2-hydroxybenzoate, 2-ethylhexyl-2-hydroxybenzoate or mixtures thereof. Other optional oil soluble benefit agents suitable for use include resorcinols like 4-hexyl resorcinol, 4-phenylethyl resorcinol, 4-cyclopentyl resorcinol, 4-cyclohexyl resorcinol 4-isopropyl resorcinol or a mixture thereof. Also, 5-substituted resorcinols like 4-cyclohexyl-5-methylbenzene-1,3-diol, 4-isopropyl-5-methylbenzene-1,3-diol, mixtures thereof or the like may be used. The 5-substituted resorcinols, and their synthesis are described in commonly assigned U.S. Published Patent Application No. 2016/0000669A1. Even other oil soluble actives suitable for use include omega-3 fatty acids, omega-6 fatty acids, climbazole, farnesol, ursolic acid, myristic acid, geranyl geraniol, oleyl betaine, cocoyl hydroxyethyl imidazoline, hexanoyl sphingosine, 12-hydroxystearic acid, petroselinic acid, conjugated linoleic acid, terpineol, thymol mixtures thereof or the like. In an embodiment of the invention, the optional oil soluble benefit agent used is a retinoic acid precursor. In one embodiment of the invention, the retinoic acid precursor is retinol, retinal, retinyl propionate, retinyl palmitate, retinyl acetate or a mixture thereof. Retinyl propionate, retinyl palmitate and mixtures thereof are typically preferred.

Still another retinoic acid precursor suitable for use is hydroxyanasatil retinoate made commercially available under the name Retextra® as supplied by Molecular Design International. The same may be used in a mixture with the oil soluble actives described herein. When optional (i.e., 0.0 to 2% by weight) oil soluble active is used in the non-water phase of the surfactant system and composition of the invention, it typically makes up from 0.001 to 1.5%, and in another embodiment, from 0.05 to 1.2%, and in yet another embodiment, from 0.1 to 0.5% by weight of the total weight of the end use composition, including all ranges subsumed therein. Opacifiers, like titanium dioxide, may also be used and can make up from 0.001 to 2.5% by weight of the end use composition.

Preservatives can desirably be incorporated into the surfactant system and end use composition to protect against the growth of potentially harmful microorganisms.

Cosmetic chemists are familiar with appropriate preservatives and routinely choose them to satisfy the preservative challenge test and to provide product stability. Suitable traditional preservatives for use include hydantoin derivatives and propionate salts. Particularly preferred preservatives are iodopropynyl butyl carbamate, phenoxyethanol, 1,2-octanediol, hydroxyacetophenone, ethylhexylglycerine, hexylene glycol, methyl paraben, propyl paraben, imidazolidinyl urea, sodium dehydroacetate, dimethyl-dimethyl (DMDM) hydantoin, benzyl alcohol, methylisothiazolinone, caprylyl glycol, sodium benzoate and mixtures thereof. Other preservatives suitable for use include sodium dehydroacetate, chlorophenesin and decylene glycol. The preservatives should be selected having regard for the use of the composition and possible incompatibilities between the preservatives and other ingredients in the emulsion. Preservatives are preferably employed in amounts ranging from 0.01% to 2% by weight of the total weight of the end use composition, including all ranges subsumed therein. Also preferred is a preservative system with hydroxyacetophenone alone or in a mixture with other preservatives.

Thickening agents (or viscosity builders) are optionally suitable for use in the surfactant systems and end use compositions of the present invention. The preferred thickening agents can be naturally derived or synthetic, are suitable for use in compositions having a pH from 4.8 to 6.5, and are suitable for use in compositions having excellent foaming/lathering qualities. Examples include hydroxypropyl starch phosphate, rheology modifying fatty acids, starches, as well as natural or chemically modified polysaccharides. Polysaccharides suitable for use include celluloses; microcrystalline celluloses; hemicelluloses; cellulose gums; pectins, like homogalacturonan, xylogalacturonan, rhamnogalacturonan; exudate polysaccharide gums, like gum arabic, gum tragacanth, acacia gum, karaya gum, ghatti gum; extractive polysaccharide gums, like Konjac gum, guar gum, locust bean gum, mustard mucilage gum, flaxseed mucilage gum, okra mucilage gum, psyllium gum; seaweed polysaccharides, like carrageenan, agar, or alginate; microbial polysaccharides, like xanthan gum, gellan gum, or pullulan gum; fermentation polysaccharides, like sclerotium gums; fructans, like inulin or levan; or mixtures of thereof. Other thickening agents suitable for use include acids like capric, lauric, stearic, myristic, or palmitic acid or mixtures thereof. Typical amounts may range from 0.0 to 12%, and often, from 0.0 to 10%, and preferably, 0.001 to 8%, and most preferably, from 0.01 to 5% by weight of the end use composition. In an embodiment of the invention, thickening agent can make up from 0.02 to 5% by weight of the end use composition, including all ranges subsumed therein.

Fragrances, fixatives, chelators (like EDTA) salts (like NaCl) and exfoliants may optionally be included in the end use composition of the present invention. Each of these substances may range from about 0.03 to about 5%, preferably between 0.1 and 3% by weight of the total weight of the liquid and composition, including all ranges subsumed therein. To the extent the exfoliants are used, those selected should be of small enough particle size so that they do not impede the performance of end use composition or any packaging it is dispensed from.

Conventional emulsifiers having an HLB of greater than 8 may optional be used. Illustrative examples include Tween, 40, 60, 80, polysorbate 20 and mixtures thereof. Typically emulsifiers for water continuous systems, when used, make up from 0.3 to 2.5% by weight of the end use composition.

Conventional humectants may optionally be employed as additives in the present invention to assist in moisturizing skin when such emulsions are topically applied. These are generally polyhydric alcohol type materials. Typical polyhydric alcohols include glycerol (i.e., glycerine or glycerin), propylene glycol, dipropylene glycol, polypropylene glycol (e.g., PPG-9), polyethylene glycol, sorbitol, hydroxypropyl sorbitol, hexylene glycol, 1,3-butylene glycol, isoprene glycol, 1,2,6-hexanetriol, ethoxylated glycerol, propoxylated glycerol and mixtures thereof. Most preferred is glycerin, propylene glycol or a mixture thereof. The amount of humectant employed may range anywhere from 0.0 to 35% by weight of the total weight of the liquid and composition. Often, humectant makes up from 0.0 to 20%, and preferably, from 0.001 to 15% by weight (most preferably, from 2 to 12% by weight) of the total weight of the end use composition.

When making the end use compositions of this invention, the desired ingredients may be mixed with conventional apparatus under moderate shear atmospheric conditions, with temperature being from ambient to 85° C. Such end use compositions will typically have a viscosity from 1 to 25,000 cps, and preferably, from 100 to 20,000 cps, and most preferably, from 500 to 10,000 cps, including all ranges subsumed therein. In another embodiment of the invention, the viscosity of the end use composition is from 1,000 to 9,800 cps, including all ranges subsumed therein.

The packaging for the end use composition of this invention can be a pump dispenser, tube, jar or plastic bottle. Preferably, the package is a bottle which is made with recyclable materials and/or post consumer resins.

The following examples are provided to facilitate an understanding of the present invention. They are not intended to limit the scope of the claims.

EXAMPLES

Table I below represents the base formula to which the surfactant system of this invention and any other ingredients as identified Table II were added. The resulting formulae were prepared by mixing the ingredients with moderate shear and at a temperature of about 35° C. Water was added to balance and surfactant and other ingredients were added as set forth in Table II. Weight percent is based on total weight of the end use composition.

TABLE I

| Ingredients | Wt. % in product as 100% active |
|---|---|
| Water | Balance |
| Chelator | 0.05% |
| Stearic Acid | 0.31% |
| Lauric Acid | 0.25% |
| Glycerin | 2.00% |
| NaOH | 0.01% |
| Citric acid | 0.80% |
| preservative | 0.05% |

TABLE II

| | Sample | | | | | | | | | |
|---|---|---|---|---|---|---|---|---|---|---|
| Exp # | Anionic Surfactant Glutamate[a] (wt %) | Nonionic Surfactant Glucamide (wt %) | Glycinate[e] (wt %) | Glucoside (wt %) | Betaine[h] (wt %) | Optional Glycerol Ester (wt %) | Thickener (wt %) | Viscosity (cps) | Formula pH | Stability* (pass/fail) |
| 1 | 2.9 | 3.6[b] | — | — | — | — | 0.6[(1)]/0.5[(2)] | 2022 | 5.3 | pass |
| 2 | 2.7 | 2.9[b] | — | — | — | — | 5.0[(3)] | 16370 | 5.4 | pass |
| 3 | 2.7 | 2.9[b] | — | — | — | — | 2.8[(4)] | 6337 | 5.4 | pass |
| 4 | 2.8 | 3.2[b] | — | — | — | — | 5.0[(5)] | 3445 | 5.5 | pass |
| 5 | 2.8 | 3.8[b] | — | — | — | — | 0.2[(6)]/1.0[(2)] | 2323 | 5.6 | pass |
| 6 | 2.8 | 3.8[b] | — | — | — | — | 2.8[(4)] | 2691 | 5.6 | pass |
| 7 | 1.3 | 5.2[c] | — | — | — | — | 0.2[(6)]/1.0[(2)] | 725 | 5.5 | pass |
| 8 | 1.3 | 5.2[c] | — | — | — | — | 5.0[(3)] | 4660 | 5.5 | pass |
| 9 | 2.8 | 3.2[d] | — | — | — | — | 4.5[(7)] | 2245 | 5.4 | pass |
| 10 | 2.8 | 3.8[d] | — | — | — | — | 5.0[(5)] | 13890 | 5.5 | pass |
| 11 | 2.9 | 2.4[b] | — | — | — | 1.2[i] | 4.5[(3)] | 1431 | 5.4 | pass |
| 12 | 2.9 | 2.4[b] | — | — | — | 1.2[j] | 4.5[(3)] | 605 | 5.5 | pass |
| 13 | 2.9 | 3.0[b] | — | — | — | 0.6[j] | 4.5[(3)] | 977 | 5.5 | pass |

TABLE II-continued

| | Sample | | | | | | | | | |
|---|---|---|---|---|---|---|---|---|---|---|
| Exp # | Anionic Surfactant Glutamate[a] (wt %) | Nonionic Surfactant Glucamide (wt %) | Glycinate[e] (wt %) | Glucoside (wt %) | Betaine[h] (wt %) | Optional Glycerol Ester (wt %) | Thickener (wt %) | Viscosity (cps) | Formula pH | Stability* (pass/fail) |
| 14 | 2.9 | 3.0[b] | — | — | — | 2.9[k] | 4.5[(3)] | 615 | 5.5 | pass |
| 15 | 2.9 | 3.6[b] | — | — | — | 0.5[l] | 4.5[(3)] | 3525 | 5.5 | pass |
| 16 | 4.0 | — | — | — | 0.8 | — | 4.2[(5)] | 272 | 5.5 | fail |
| 17 | — | 3.2[b] | — | — | 2.8 | — | 4.2[(5)] | 3346 | 5.1 | fail |
| 18 | 2.9 | 1.5[b] | — | — | 0.6 | — | 4.2[(5)] | 1599 | 5.5 | fail |
| 19 | — | 1.3[b] | 5.2 | — | — | — | 1.2[(8)] | 110 | 6.5 | fail |
| 20 | — | 5.2[c] | 1.3 | — | — | — | 0.2[(6)]/1.0[(2)] | 6623 | 5.4 | fail |
| 21 | — | — | 5.2 | 1.3[f] | — | — | 1.2[(8)] | 110 | 6.3 | fail |
| 22 | — | — | 2.0 | 4.0[f] | — | — | 0.7[(9)] | 856 | 4.9 | fail |
| 23 | 2.4 | — | 3.2 | — | — | — | 0.7[(9)] | 2293 | 5.5 | fail |
| 24 | 5.2 | — | 1.3 | — | — | — | 0.2[(6)]/0.8[(2)] | 501 | 5.5 | fail |
| 25 | 4.0 | — | — | 1.0[f] | — | — | 0.5[(9)] | 533 | 5.2 | fail |
| 26 | 1.0 | — | 4.5 | 1.0[f] | — | — | 1.2[(8)] | 774 | 6.3 | fail |
| 27 | — | — | 4.5 | 2.0[f+g] | — | — | 1.2[(8)] | 448 | 6.3 | fail |
| 28 | 1.0 | 1.0[b] | 4.5 | — | — | — | 1.2[(8)] | 118 | 6.1 | fail |
| 29 | 2.8 | 1.0[b] | 2.8 | — | — | — | 0.4[(6)]/0.6[(10)] | 246 | 5.5 | fail |
| 30 | 2.8 | 1.0[b] | 2.8 | — | — | — | 5.0[(11)] | 2057 | 5.6 | fail |
| 31 | 2.8 | 1.0[b] | 2.8 | — | — | — | 1.0[(12)] | 3.9 | 5.6 | fail |
| 32 | 2.8 | 1.0[b] | 2.8 | — | — | — | 5.0[(13)] | 973 | 5.5 | fail |
| 33 | 2.8 | 1.0[b] | 2.8 | — | — | — | 5.0[(13)] | 973 | 5.5 | fail |
| 34 | 2.8 | 1.0[b] | 2.8 | — | — | — | 1.5[(14)] | 842 | 5.4 | fail |
| 35 | 2.8 | 1.0[b] | 2.8 | — | — | — | 1.0[(15)] | 2802 | 5.6 | fail |
| 36 | 2.8 | 1.0[b] | 2.8 | — | — | — | 1.0[(1)]/0.6[(10)] | 3426 | 5.6 | fail |
| 37 | 2.8 | 1.0[b] | 2.8 | — | — | — | 3.0[(16)] | 17140 | 5.4 | fail |
| 38 | 2.8 | 1.0[b] | 2.8 | — | — | — | 4.0[(17)] | 11470 | 5.4 | fail |
| 39 | 2.8 | 1.0[b] | 2.8 | — | — | — | 4.0[(18)] | 4436 | 5.4 | Fail |
| 40 | 2.8 | 1.0[b] | 2.8 | — | — | — | 1.0[(19)] | 556 | 5.4 | fail |

*Stability Pass is defined as the product has no separation and no particles at ambient condition for 4 weeks; Stability Fail is defined as the product has separation and/or particles at ambient condition for 4 weeks. As can be seen from the data presented, compositions made consistent with the present invention are surprisingly stable. When trained panellists washed their hands for 20 seconds with the compositions of the present invention, the compositions surprisingly delivered excellent lathering characteristics.

[a]Sodium Lauroyl Glutamate (Galsoft SLGL PF, Galaxy Surfactants)

[b]Lauroyl/Myristoyl Methyl Glucamide - (GlucoTain ® Flex, Clariant)

[c]Capryloyl/Caproyl Methyl Glucamide (and) Lauroyl/Myristoyl Methyl Glucamide (GlucoTain ® Plus, Clariant)

[d]Cocoyl Methyl Glucamide (GlucoTain ® Care, Clariant)

[e]Sodium Cocoyl Glycinate (Geropon ® CG 3S, Solvay)

[f]Sodium Lauryl Glucose Carboxylate (and) Lauryl Glucoside (Planapon ® LGC Sorb, BASF)

[g]Decyl Glucoside (Plantaren ® 2000 N UP, BASF)

[h]Cocamidopropyl betaine (Mackam ® C 37B, Solvay)

[i]Polyglyceryl-10 Stearate (SYNETH ™ S10 K, Lonza)

[j]Polyglyceryl-10 Caprylate/Caprate (SYNETH ™ C15 K, Lonza)

[k]Polyglyceryl-10 caprate/caprylate & polyglyceryl-10 laurate (GalPG-10L, Galaxy Surfactants)

[l]Polyglyceryl-3 Oleate (GalPG3O, Galaxy Surfactants)

[(1)]Xathan Gum (Rheocare ® XG, BASF)

[(2)]Guar Gum (GuarNT 3500F, TIC Gums)

[(3)]Hydroxypropyl starch phosphate (Stardesign ™, StarDesign Care, Cargill)

[(4)]Xanthan gum and Cellulose (30% by weight xanthan)

[(5)]Hydroxypropyl starch phosphate (Stardesign ™, CCreamTex 06329, Cargill)

[(6)]Carrageenan (Genugel ® Carrageenan CG-130, CPKelco)

[(7)]Hydroxypropyl starch phosphate (Stardesign ™, EmTex 06379, Cargill)

[(8)]Polyacrylate-33 (Rheomer ® 33, Solvay)

[(9)]Acrylates/C10-30 Alkyl Acrylate Crosspolymer (Carbopol ®, Ultrez 20, Lubrizol)

[(10)]Ceratonia Siliqua Gum (Polycos ® 18/1-85 LS C, Polygal AG)

[(11)]Solagum AX (Seppic)

[(12)]Agar (Agar 100, TIC Gums)

[(13)]Sodium Hydroxypropyl starch phosphate (Starch B980, Grain Processing)

[(14)]Acrylates Copolymer (Carbopol ® Aqua SF-1 OS, Lubrizol)

[(15)]Hydroxypropyl Methylcellulose (Benecel ™ E10M, Ashland)

[(16)]PEG-120 Methyl Glucose Trioleate (and) Propylene Glycol, (Glucamate ™ LT, Lubrizol)

[(17)]Poloxamer 338 & PPG-12/SMDI Copolymer (ExpertGel EG312 ™, DKSH)

[(18)]Poloxamer 407 & PPG-12/SMDI Copolymer (ExpertGel EG412 ™, DKSH)

[(19)]30 wt % Estogel M in Caprylic/Capric Triglyceride (ExpertGel M ™),

What is claimed is:

1. A surfactant system comprising:

a) an anionic dicarboxylate comprising a glutamate, aspartate or both;

b) a nonionic comprising a glucamide; and c) optionally water wherein the surfactant system is suitable for use in wash composition that has a pH from 4.8 to 6.5, the anionic dicarboxylate and nonionic comprising a glucamide are at a weight ratio from 1:3 to 3:1 and make up from 85 to 100% by weight total surfactant in the surfactant system.

2. The surfactant system according to claim 1 wherein the anionic dicarboxylate comprising a glutamate, aspartate or both has the formula:

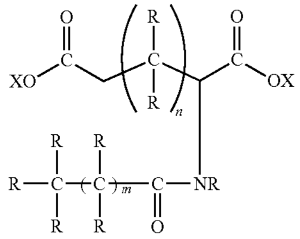

and the nonionic comprising a glucamide has a formula:

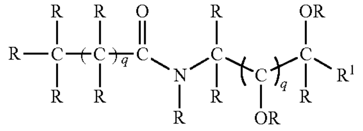

wherein from 10 to 90% by weight of surfactant in the system is neutralized, further wherein:

i) each R is independently H or a $C_{1-6}$ alkyl, with the proviso that at least 50% of the R groups on each formula independently are H;

ii) each X is independently $H^+$, $Na^+$, $K^+$, $Ca^+$ or $Mg^+$, with the proviso that each X is not simultaneously $H^+$;

iii) n is 0 or 1, and m is an integer from 6 to 18;

iv) each q is independently an integer from 2 to 18; and v) $R^1$ is H, OH, $C_{1-6}$ alkyl or

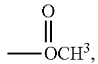, and further wherein the surfactant system comprises from 0 to 1.5% by weight of a glycinate.

3. A wash composition with a surfactant system composition comprising:

a) an anionic dicarboxylate comprising a glutamate, aspartate or both;

b) a nonionic comprising a glucamide; and c) optionally water wherein the wash composition has a pH from 4.8 to 6.5, the anionic dicarboxylate and nonionic comprising a glucamide are at a weight ratio from 1:4 to 4:1 and make up from 85 to 100% by weight total surfactant in the surfactant system and wash composition.

4. The wash composition according to claim 3 wherein the anionic dicarboxylate comprising a glutamate, aspartate or both has the formula:

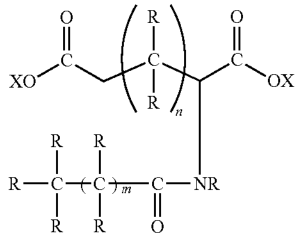

and the nonionic comprising a glucamide has a formula:

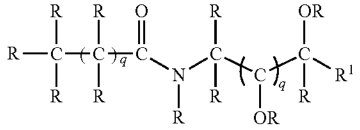

wherein from 10 to 90% by weight of surfactant in the system is neutralized, further wherein:

i) each R is independently H or a $C_{1-6}$ alkyl, with the proviso that at least 50% of the R groups on each formula independently are H;

ii) each X is independently $H^+$, $Na^+$, $K^+$, $Ca^+$ or $Mg^+$, with the proviso that each X is not simultaneously $H^+$;

iii) n is 0 or 1, and m is an integer from 6 to 18;

iv) each q is independently an integer from 2 to 18; and v) $R^1$ is H, OH, $C_{1-6}$ alkyl or

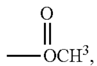, and further wherein the wash composition comprises from 3 to 15% by weight total surfactant.

5. The wash composition according to claim 3 wherein the wash composition is a home care composition, shampoo, makeup wash, or a personal care liquid body wash.

6. The wash composition according to claim 4 wherein the wash composition is a baby wash composition that is transparent, translucent or opacified.

7. The wash composition according to claim 3 wherein total surfactant in the wash composition is 95 to 100% by weight anionic dicarboxylate comprising a glutamate, aspartate or both and nonionic comprising a glucamide.

8. The wash composition according to claim 3 wherein the wash composition further comprises a rheology modifier.

9. The wash composition according to claim 3 wherein the wash composition comprises less than 2.5% by weight glycinate and less than 0.5% by weight betaine when the total weight of surfactant in the composition is less than 5% by weight.

10. The wash composition according to claim 3 wherein the wash composition has a viscosity from 1 to 25,000 cps.

11. The wash composition according to claim 3 wherein the pH of the wash composition is from 4.8 to 6.5.

12. The wash composition according to claim 3 wherein the wash composition comprises from 30 to 95% by weight water and anionic dicarboxylate to nonionic are at a weight ratio from 1:43 to 43:1.

13. The wash composition according to claim 3 wherein the wash composition comprises from 30 to 95% by weight water and anionic dicarboxylate to nonionic are at a weight ratio from 1:1.5 to 1.5:1.

14. The wash composition according to claim 3 wherein the pH of the wash composition is 5.0 to 6.2 and the anionic dicarboxylate to nonionic are at a weight ratio from 1:43 to 43:1 and further wherein the wash composition comprises from 30 to 85% by weight water.

15. The wash composition according to claim 3 wherein the wash composition comprises from 0.0 to 1.5% by weight glycinate.

16. The wash composition according to claim 3 wherein the wash composition comprises from 0.0 to 0.4% by weight of a betaine.

17. The wash composition according to claim 3 wherein the wash composition further comprises niacinamide, retinyl propionate, 4-ethyl resorcinol, 4-hexyl resorcinol, 12-hydroxystearic acid or a mixture thereof.

18. The wash composition according to claim 3 wherein the wash composition is free of sulfates, betaines, glycinates, polyglycosides and sultaines.

* * * * *